US012767157B2

(12) United States Patent
Laender et al.

(10) Patent No.: US 12,767,157 B2
(45) Date of Patent: Oct. 20, 2026

(54) METHOD AND DEVICE FOR PREVENTING, ACCORDING TO THE SITUATION, AN AUTOMATED MOTOR VEHICLE FROM DRIVING OFF

(71) Applicant: Bayerische Motoren Werke Aktiengesellschaft, Munich (DE)

(72) Inventors: Simon Laender, Germering (DE); Alexander Belz, Munich (DE); Benjamin Geirhos, Munich (DE); Dennis Zimmermann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 36 days.

(21) Appl. No.: 18/837,635

(22) PCT Filed: Jan. 26, 2023

(86) PCT No.: PCT/EP2023/051843
§ 371 (c)(1),
(2) Date: Aug. 12, 2024

(87) PCT Pub. No.: WO2023/165765
PCT Pub. Date: Sep. 7, 2023

(65) Prior Publication Data

US 2025/0196872 A1 Jun. 19, 2025

(30) Foreign Application Priority Data

Mar. 2, 2022 (DE) ..................... 10 2022 104 932.9

(51) Int. Cl.
*B60W 50/12* (2012.01)
*B60W 30/09* (2012.01)
*B60W 30/18* (2012.01)

(52) U.S. Cl.
CPC ............ *B60W 50/12* (2013.01); *B60W 30/09* (2013.01); *B60W 30/18027* (2013.01);
(Continued)

(58) Field of Classification Search
CPC ................. B60W 50/12; B60W 30/09; B60W 30/18027; B60W 2420/403;
(Continued)

(56) References Cited

U.S. PATENT DOCUMENTS 8,436,721 B1 * 5/2013 Lee ......................... B60R 25/24
180/289
2012/0265418 A1 10/2012 Foerster et al.
(Continued)

FOREIGN PATENT DOCUMENTS

DE 10 2009 057 836 A1 6/2011
DE 10 2010 028 911 A1 11/2011
(Continued)

OTHER PUBLICATIONS

Z. Farkas, A. Mihály and P. Gáspár, "Control methods for the coordination of autonomous vehicles at intersections," 2020 European Control Conference (ECC), St. Petersburg, Russia, 2020, pp. 668-673, (Year: 2020).*
(Continued)

*Primary Examiner* — Kito R Robinson
*Assistant Examiner* — Tanya C Sienko
(74) *Attorney, Agent, or Firm* — Crowell & Moring LLP

(57) ABSTRACT

A method for preventing an automated motor vehicle from driving-off. Sensor data relating to the state of the surroundings of the automated motor vehicle and the state of the driver of the automated motor vehicle is captured. An imminent driving-off of the vehicle triggered by the driver is predicted based on the sensor data. The driving-off is
(Continued)

prevented based on the state of the surroundings of the vehicle reflected by the sensor data.

10 Claims, 2 Drawing Sheets

(52) U.S. Cl.
CPC . *B60W 2420/403* (2013.01); *B60W 2420/408* (2024.01); *B60W 2420/54* (2013.01); *B60W 2540/18* (2013.01); *B60W 2540/221* (2020.02); *B60W 2552/53* (2020.02); *B60W 2556/40* (2020.02); *B60W 2556/45* (2020.02)

(58) Field of Classification Search
CPC ....... B60W 2420/408; B60W 2420/54; B60W 2540/18; B60W 2540/221; B60W 2552/53; B60W 2556/40; B60W 2556/45; B60W 2540/10; B60W 2540/12; B60W 2540/225; B60W 2554/40; B60W 2556/50; B60W 2556/65; B60W 30/18154
See application file for complete search history.

(56) References Cited

U.S. PATENT DOCUMENTS

2014/0132404 A1* 5/2014 Katoh ................... B60R 21/013 340/436
2015/0019447 A1* 1/2015 Baughman ............. G07C 5/008 705/305
2015/0232026 A1 8/2015 Lueke et al.
2017/0158193 A1 6/2017 Lopez et al.
2021/0129865 A1* 5/2021 Jeong ...................... G08G 1/162
2021/0188323 A1* 6/2021 Kohlhuber ............ B60W 30/09
2021/0291836 A1* 9/2021 Cho ................ B60W 30/18054
2021/0339746 A1* 11/2021 Yatagai ................. B60W 10/18
2023/0020040 A1* 1/2023 Tam ...................... G08G 1/0141
2023/0053423 A1* 2/2023 Jäger ...................... B60W 30/09

FOREIGN PATENT DOCUMENTS

DE 10 2015 001 114 A1 8/2015
DE 10 2015 224 338 A1 6/2017
DE 10 2015 225 135 A1 6/2017
WO WO-2014053134 A1 * 4/2014 ....... G08G 1/096725

OTHER PUBLICATIONS

Machine translation of WO2014053134, downloaded from IP.com Nov. 10, 2025 (Year: 2025).*
International Search Report (PCT/ISA/210) issued in PCT Application No. PCT/EP2023/051843 dated Mar. 30, 2023 with English translation (6 pages).
German-language Written Opinion (PCT/ISA/237) issued in PCT Application No. PCT/EP2023/051843 dated Mar. 30, 2023 with English translation (9 pages).
German-language Search Report issued in German Application No. 10 2022 104 932.9 dated Jul. 12, 2022 with partial English translation (12 pages).

* cited by examiner

METHOD AND DEVICE FOR PREVENTING, ACCORDING TO THE SITUATION, AN AUTOMATED MOTOR VEHICLE FROM DRIVING OFF

BACKGROUND AND SUMMARY

The present invention relates to a method for preventing, according to the situation, an automated motor vehicle from driving off and a device for data processing which is designed to at least partially carry out the method. Furthermore, an automated motor vehicle having the data processing device is provided. Additionally or alternatively, a computer program is provided comprising commands which, upon the execution of the program by a computer, cause it to at least partially carry out the method. Additionally or alternatively, a computer-readable medium is provided comprising commands, which, upon the execution of the commands by a computer, cause it to at least partially carry out the method.

Driver assistance systems are increasingly being installed in automated motor vehicles, which assist a driver in performing a driving task or take over the driving task in a completely automated manner.

Such driver assistance systems are also used in the area of so-called active safety systems. A distinction is made in safety systems for motor vehicles between passive and active safety systems. The active safety systems are those which are supposed to safeguard a motor vehicle from an accident taking place at all. The passive safety systems, in contrast, are supposed to mitigate the consequences for the occupants in the event of an accident, in order to thus entirely preclude physical injuries or be able to reduce them to a minimum.

Frontal protection systems are known from the prior art, which use kinematics and surroundings variables of an automated motor vehicle in order to carry out an active intervention in a longitudinal guidance of the automated motor vehicle to avoid a collision which will possibly occur due to a driver action in driving off situations and thus prevent the motor vehicle from driving off or driving into a collision-critical area. Triggering of the frontal protection system in the low speed range is obstructed in particular by the use of the kinematics of the motor vehicle and of surroundings variables and incorrect triggering is thus avoided.

However, it is problematic that driving off situations often can only be detected too late on the basis of the kinematics of the automated motor vehicle. Collision avoidance is then sometimes no longer possible due to the great momentum when driving off and manifold latencies in the system. In particular in a conflict situation (correct positive or false positive), for example when easing into an intersection, there is potential for improvement of such driver assistance systems.

Against the background of this prior art, the object of the present invention is to specify a device and a method which are each capable of at least overcoming the above-mentioned disadvantages of the prior art.

The object is achieved by the features of the independent claim. The dependent claims contain preferred refinements of the invention.

Accordingly, the object is achieved by a method for preventing or suppressing, according to the situation, an automated motor vehicle from driving off.

The method can be computer-implemented, i.e., at least one of the method steps can be carried out by means of a computer.

The automated motor vehicle driving off can be understood in principle as an acceleration from a standstill. However, it is also conceivable that additionally or alternatively an acceleration from a low speed range can be understood under the concept of driving off. This low speed range can be bounded at the top, for example, in automatic motor vehicles (i.e., having automatic transmission) by a maximum creep speed (i.e., driving of the motor vehicle without accelerator pedal actuation and without brake pedal actuation). It is conceivable that the acceleration has to result in a speed greater than a predetermined limiting value, for example, the maximum creep speed, in order for driving off to be presumed. The driving off can be restricted to a positive acceleration of the automated motor vehicle, i.e., driving forward.

The method comprises recording sensor data relating to a status of the surroundings of the automated motor vehicle and a status of a driver of the automated motor vehicle.

That is to say, the surroundings of the motor vehicle are scanned or observed by means of a sensor system installed on the motor vehicle and the driver of the motor vehicle is observed by means of possibly partially the same and/or an additional sensor system, which can also be at least partially installed in and/or on the motor vehicle.

The method furthermore comprises predicting, based on the sensor data, imminent driving off of the automated motor vehicle triggered by the driver of the motor vehicle.

The method moreover comprises preventing driving off depending on the status of the surroundings of the automated motor vehicle resulting from the sensor data.

In other words, at least two conditions are taken into consideration, one of these relates to the status of the driver of the motor vehicle and one relates to the status of the surroundings of the motor vehicle in order to predict the (imminent) driving off and suppress it. That is to say, the driving off is suppressed only when both conditions are met. Suppressing the driving off can comprise an intervention in a longitudinal guidance of the motor vehicle. It is conceivable that a control signal is output for this purpose to a brake system of the motor vehicle, a neutral gear/parking gear is engaged by means of a control signal output to a transmission of the motor vehicle and/or a drive torque is reduced by means of a control signal output to an engine control of the motor vehicle.

Furthermore, it is conceivable that additionally to the above-described variables, kinematics of the automated motor vehicle, such as acceleration, speed, etc., are taken into consideration in the prediction of the planned driving off.

The present method has the advantage that the planned or imminent driving off of the motor vehicle can be recognized both earlier and with greater reliability, since in contrast to conventional methods not only the surroundings of the motor vehicle or its kinematics, but rather the driver himself is monitored or taken into consideration.

Optional refinements of the method for operating the emergency braking assistant are described hereinafter.

Sensors for recording the sensor data relating to the status of the driver of the automated motor vehicle can comprise interior sensors, pedal sensors, a steering angle sensor, a heart rate monitor of the driver, and/or an operator interface sensor system. All of these sensors can be connected in a wired and/or wireless manner to a data processing device installed in the automated motor vehicle, which predicts the driving off of the automated motor vehicle based on the received sensor data. Many or all of these sensors can already be installed in the automated motor vehicle, i.e., signals and/or information can be tapped from a control unit and/or a bus system of the motor vehicle in order to thus obtain the required information for determining the status of the driver. The proposed method is advantageous in particular because of this, since conventional automated motor vehicles sometimes do not have to be changed or only have to be changed slightly with regard to hardware in order to implement the method. Additionally or alternatively, data which are obtained by means of vehicle-to-everything (V2X) communication can also be used as sensor data. V2X can accordingly be used as an indicator of the imminent driving off intention (for example, traffic signal switches to green and/or red traffic signal phases, etc., which are received, for example, via the backend). V2X is the communication between a vehicle and any device which can influence the vehicle or can be influenced by it. It is a vehicle communication system, which can comprise other, more specific types of communication such as V2I (vehicle-to-infrastructure), V2N (vehicle-to-network), V2V (vehicle-to-vehicle), V2P (vehicle-to-pedestrian), and/or V2D (vehicle-to-device). Vehicle-to-vehicle communication can also be designated as car-to-car (C2C) communication. It is also conceivable that additionally or alternatively a driving behavior of a vehicle in front is taken into consideration (for example, when the vehicle in front drives off, driving off can possibly also be expected for the automated motor vehicle).

Sensors for recording the sensor data relating to the surroundings of the automated motor vehicle can comprise a radar sensor, a LiDAR sensor, a camera, and/or an ultrasonic sensor. As described above, many or all of the sensors can already be installed in the automated motor vehicle, i.e., signals and/or information can be tapped from a control unit and/or a bus system of the motor vehicle in order to thus obtain the required information for determining the status of the environment or the surroundings. The proposed method is advantageous in particular because of this, since conventional automated motor vehicles sometimes do not have to be changed or only have to be changed slightly with respect to hardware in order to implement the method.

The prediction of the imminent driving off of the automated motor vehicle triggered by the driver of the motor vehicle can be carried out based on the sensor data relating to the status of the driver of the automated motor vehicle. Additionally or alternatively, information relating to the surroundings of the automated motor vehicle can be incorporated. It is conceivable that the sensor data of the various sensors are (at least partially) fused for this purpose and/or the driving off is predicted based on sensor data of individual sensors. It is conceivable that a (probability) value for the driving off is determined based on the received sensor data, the determined (probability) value is compared to a predetermined limiting value, and the driving off is predicted (driving off=true) if the determined (probability) value exceeds the predetermined limiting value.

The method can comprise determining the status of the surroundings of the automated motor vehicle based on the sensor data relating to the status of the surroundings of the automated motor vehicle. That is to say, the sensor data which were recorded by means of the radar sensor, the LiDAR sensor, the camera, and/or the ultrasonic sensor can be used to determine the status of the surroundings of the motor vehicle.

To determine the status of the surroundings of the automated motor vehicle, surroundings model information from a surroundings model determined based on the sensor data relating to the status of the surroundings of the automated motor vehicle and/or mapped intersections and/or pedestrian crossings in the surroundings of the automated motor vehicle can be taken into consideration. A surroundings model can be understood as a model of the surroundings of the automated motor vehicle determined by means of sensor data fusion, which can comprise information about further road users (e.g., position, speed, acceleration, movement direction, planned trajectory, etc.), static objects (e.g., parked motor vehicles, obstacles, etc.), a road and/or lane guidance (e.g., turnoffs, intersections, etc.), and/or traffic rules of (e.g., right-of-way regulations, permissible highest speed, traffic signal systems and their status, etc.) in the surroundings of the automated motor vehicle. An extent of the surroundings is dependent here on a type of the sensor data used for the surroundings model determination and in particular on a design of the sensors used to record the sensor data or their field of view (FOV).

Determining the status of the surroundings of the automated motor vehicle can comprise establishing a presence of a collision-critical area, wherein the driving off can only or exclusively be prevented if the automated motor vehicle is in the collision-critical area and/or will be there due to the predicted driving off.

The collision-critical area can be defined as an area or a region in the surroundings of the automated motor vehicle in which a collision of the motor vehicle with a motor vehicle-external object can occur or it is probable that such a collision will occur when the motor vehicle is located in this area. The motor vehicle-external object can be, for example, a further motor vehicle (e.g., automobile, motorcycle, etc.), a pedestrian, and/or a bicyclist.

The method can comprise identifying a collision-relevant motor vehicle-external object in the surroundings of the automated motor vehicle, wherein its planned trajectory intersects a trajectory of the automated motor vehicle if the automated motor vehicle drives off. The method can be used here in the case of road intersections, but is not restricted thereto. Rather, further scenarios in which the method is applied are additionally or alternatively conceivable. These scenarios can comprise roundabouts, exits (driveways), stopping points, pedestrian crossings, longitudinal scenarios (such as stop & go), and/or objects in the surroundings of the motor vehicle (for example, tree, property wall). The term vehicle can be interpreted broadly in the present case and can also comprise pedestrians, who can also be collision-relevant.

The trajectory describes a planned movement path of the motor vehicle-external object or the automated motor vehicle and can also comprise, in addition to position data, a chronological component, i.e., information about when the motor vehicle-external object or the automated motor vehicle will be located where. If the two movement paths intersect, and optionally if the motor vehicle-external object and the automated motor vehicle are at the intersection point within the same period of time, intersecting trajectories can be presumed.

The collision can be defined as a crash of the automated motor vehicle with the identified motor vehicle-external object.

The description above can be summarized as follows in other words and with respect to a specific embodiment, which is described as nonlimiting for the present disclosure: In a first step, an observation of driver and surroundings takes place by means of a sensor system of the motor vehicle. The driver is observed via sensors of any type (interior sensors, pedals, steering angle, heart rate monitor, MMI usage, and/or driving experience switch, etc.). The vehicle surroundings are observed on the basis of a surroundings model, map data, and/or a traffic signal identification. In a second step, imminent driving off is then predicted on the basis of the variables obtained by the observation of driver and surroundings. That is to say, the prediction is carried out, for example, by an evaluation of the pedals and interior sensors, by mapped intersections, pedestrian crossings, etc. and comprises avoiding incorrect identifications of driving off by way of surroundings model information (for example, driver eases out of a driveway between parked vehicles). In a third step, depending on the result of the second step, vehicle actuators (drive and/or brake) are actuated to prevent driving off. This can mean, for example, that the vehicle has initially come to a standstill at an intersection. While at a standstill, the surroundings and the driver actions are detected (first step). A possibly imminent driving off process and a collision-critical area are then detected (second step). If both criteria are met, the driving off of the motor vehicle is then suppressed. This can be carried out, for example, by actuating the brake, engaging the neutral gear/parking gear, and/or reducing the drive torque (third step).

Furthermore, a data processing device is provided. The data processing device can be designed to be installed in and/or on an automated motor vehicle. The data processing device is distinguished in that it is designed to at least partially carry out the above-described method.

The data processing device can be part of a driver assistance system or can represent it. The data processing device can be, for example, an electronic control unit (ECU). The electronic control unit can be an intelligent processor-controlled unit which can communicate, for example, via a central gateway (CGW) with other modules and can form the vehicle onboard network, possibly via field buses, such as the CAN bus, LIN bus, MOST bus, and FlexRay or via automotive ethernet, for example, together with telematics control units. It is conceivable that the control unit controls functions relevant for the driving behavior of the motor vehicle, such as the engine control, the force transmission, the braking system, and/or the tire pressure monitoring system. Moreover, driver assistance systems, such as a parking assistant, an adaptive cruise control (ACC), a lane keeping assistant, a lane change assistant, a traffic sign identification, a light signal identification, a driving off assistant, a night vision assistant, an emergency braking assistant, and/or an intersection assistant, can be controlled by the control unit.

It is conceivable that the control device is connected to a longitudinal guidance regulating unit or longitudinal guidance control unit, in particular a braking system of the motor vehicle, which enables an automated intervention in the longitudinal guidance of the motor vehicle, in particular a reduction of its speed and/or a prevention of an increase of its speed, based on a control signal received from the control device.

The description above with reference to the method also applies analogously to the data processing device and vice versa.

Furthermore, an automated motor vehicle is provided. The automated motor vehicle is distinguished in that it comprises the above-described data processing device.

The motor vehicle can be a passenger vehicle, in particular an automobile. The automated motor vehicle can be designed to at least partially and/or at least temporarily take over a longitudinal guidance and/or a lateral guidance during automated driving of the motor vehicle. The automated driving can take place so that the movement of the motor vehicle takes place (substantially) autonomously. The automated driving can be at least partially and/or temporarily controlled by the data processing device.

The motor vehicle can be a motor vehicle of autonomy level 0, i.e., the driver takes over the dynamic driving task, even if assisting systems (such as ABS or ESP) are present.

The motor vehicle can be a motor vehicle of autonomy level 1, i.e., it can have specific driver assistance systems which assist the driver in the vehicle operation, such as adaptive cruise control (ACC).

The motor vehicle can be a motor vehicle of autonomy level 2, i.e., it can be semiautomated so that functions such as automated parking, lane keeping or lateral guidance, general longitudinal guidance, acceleration and/or deceleration are taken over by driver assistance systems.

The motor vehicle can be a motor vehicle of autonomy level 3, i.e., it can be conditionally automated so that the driver does not have to continuously monitor the system of the vehicle. The motor vehicle independently carries out functions such as triggering the turn signal, lane changing, and/or lane keeping. The driver can turn his attention to other things, but is prompted by the system to take over the control as needed within a prewarning time.

The motor vehicle can be a motor vehicle of autonomy level 4, i.e., it can be so highly automated that the guidance of the vehicle is permanently taken over by the system of the vehicle. If the driving tasks are no longer managed by the system, the driver can be prompted to take over the guidance.

The motor vehicle can be a motor vehicle of autonomy level 5, i.e., fully automated so that the driver is not required to fulfill the driving task. Except for establishing the destination and starting the system, no human intervention is necessary.

The description above with reference to the method and the data processing device also applies analogously to the motor vehicle and vice versa.

Furthermore, a computer program is provided. The computer program is distinguished in that it comprises commands which, upon the execution of the program by a computer, cause it to at least partially carry out the above-described method.

A program code of the computer program can be provided in an arbitrary code, in particular in a code which is suitable for controllers of motor vehicles.

Furthermore, a computer-readable medium, in particular a computer-readable storage medium, is provided. The computer-readable medium is distinguished in that it comprises commands which, upon execution of the program by a computer, cause it to at least partially carry out the above-described method.

That is to say, a computer-readable medium can be provided which comprises an above-defined computer program. The computer-readable medium can be any digital data storage device, such as a USB stick, a hard drive, a CD-ROM, an SD card, or an SSD card. The computer program does not necessarily have to be stored on such a computer-readable storage medium in order to be made available to the motor vehicle, but rather can also be externally acquired via the Internet or in another way.

The description above with reference to the method, the data processing device, and the automated motor vehicle also applies analogously to the computer program and the computer-readable medium and vice versa.

An embodiment is described hereinafter with reference to FIGS. 1 and 2.

DETAILED DESCRIPTION OF THE DRAWINGS

Figure 1:
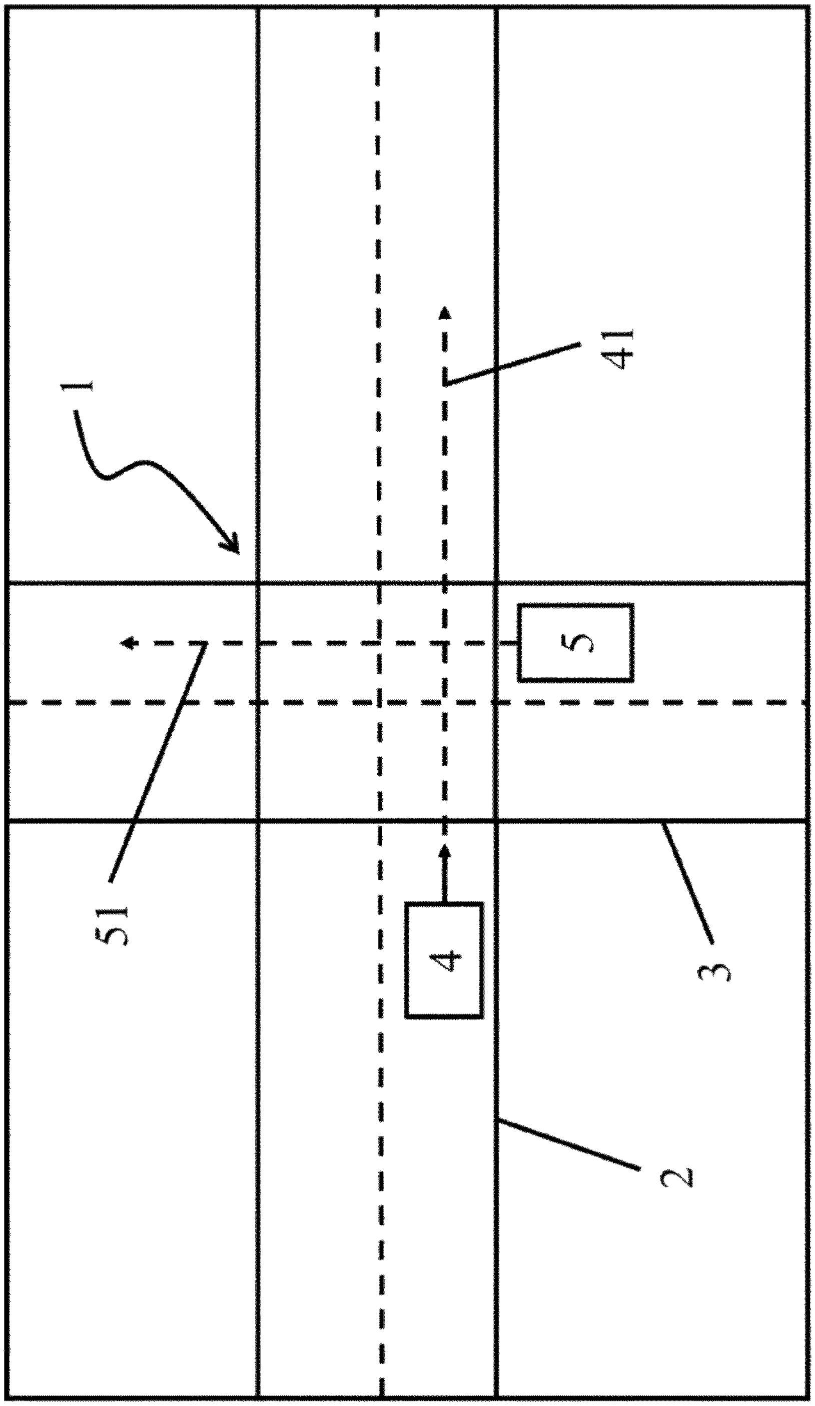
FIG. 1 schematically shows a driving situation in which a method is carried out for preventing, according to the situation, an automated motor vehicle from driving off, and FIG. 2 schematically shows a flow chart of the method.

FIG. 1 schematically shows a road intersection 1 in a top view, at which two roads 2, 3 intersect at an angle of 90°. On one of the two roads 2, a motor vehicle 4 drives or moves toward the road intersection 1, as symbolized in FIG. 1 by the arrow on the motor vehicle 4. On the other of the two roads 3, a further motor vehicle 5 stands before the intersection 1. The motor vehicle 5 shown in FIG. 1 is an automated motor vehicle which is designed to carry out a method for preventing, according to the situation, the automated motor vehicle 5 from driving off. That is to say, the automated motor vehicle 5 comprises a data processing device (not shown) having a driver assistance system, which is supposed to prevent a collision with a motor vehicle-external object, the motor vehicle 4 here, by intervening in a longitudinal guidance of the motor vehicle 5.

Figure 2:
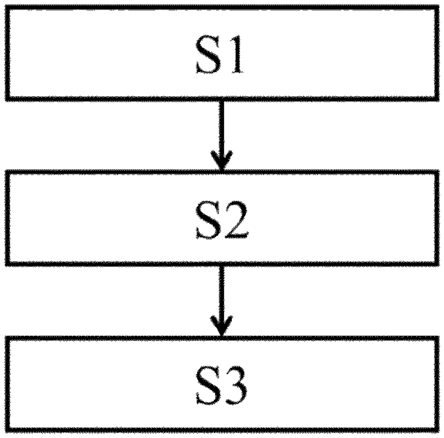

As shown in FIG. 2, the method comprises three steps S1-S3 for this purpose.

In a first step S1 of the method, sensor data relating to a status of the surroundings of the automated motor vehicle 5 and a status of a driver of the automated motor vehicle 5 are recorded by means of a sensor system (not shown) of the automated motor vehicle 5. The sensors for recording the sensor data relating to the status of the driver of the automated motor vehicle 5 can comprise interior sensors (such as an interior camera), pedal sensors (for example, for determining brake pedal actuation and/or accelerator pedal actuation), a steering angle sensor, a heart rate monitor of the driver, and/or operator interface sensors (e.g., switches, buttons, turn-press controllers, etc.). The sensors for recording the sensor data relating to the surroundings of the automated motor vehicle 5 can comprise a radar sensor, a LiDAR sensor, a camera, and/or an ultrasonic sensor. A so-called surroundings model can be calculated in the context of a sensor data fusion from the sensor data recorded in relation to the surroundings of the automated motor vehicle 5. The surroundings model can comprise information about further road users in the surroundings of the automated motor vehicle 5, information about static surroundings (e.g., parked automobiles, obstacles, etc.) of the automated motor vehicle 5, information about the traffic regulation in the surroundings of the automated motor vehicle 5 (e.g., traffic signals and their status, traffic signs, etc.), information about a lane guidance in the surroundings of the automated motor vehicle 5, and/or a current position of the automated motor vehicle 5. Map data can also be incorporated into the surroundings model. It would also be conceivable, analogously to the surroundings model, to calculate a driver model based on the sensor data relating to the status of the driver.

In a second step S2 of the method, a forecast or a prediction is carried out of imminent driving off of the automated motor vehicle 5 triggered by the driver of the automated motor vehicle 5 based on the sensor data. More precisely, the imminent driving off of the automated motor vehicle 5 is predicted based on the sensor data relating to the status of the driver of the automated motor vehicle (for example, on the above-mentioned driver model). A probability value can be determined here for the driving off based on the sensor data and this probability value can be compared to a predetermined limiting value, wherein if the limiting value is exceeded, driving off is assumed or driving off is predicted (e.g., the pulse of the driver rising, the driver looking forward, and the driver letting off the brake and beginning to actuate the accelerator pedal indicates an increased probability value of driving off). If the probability value is below the limiting value, the method can be aborted and/or started from the beginning. If the probability value is above the limiting value, a third step S3 of the method can be carried out.

In the third step S3 of the method, the forecast or predicted driving off of the automated motor vehicle 5 is prevented by an intervention in a longitudinal guidance of the motor vehicle 5 depending on the status of the surroundings of the automated motor vehicle 5 resulting from the sensor data. For this purpose, initially the status of the surroundings of the automated motor vehicle 5 is determined based on the sensor data relating to the status of the surroundings of the automated motor vehicle 5. That is to say, to determine the status of the surroundings of the automated motor vehicle 5, surroundings model information from the determined or calculated surroundings model and/or information about mapped intersections and/or pedestrian crossings (i.e., intersections and/or pedestrian crossings which are recorded in the digital map) in the surroundings of the automated motor vehicle 5 are taken into consideration. The determination of the status of the surroundings of the automated motor vehicle 5 comprises establishing a presence of a collision-critical area here. For this purpose, the road intersection 1 is identified in the present case by means of the map data and/or by means of the surroundings model. Moreover, a planned trajectory 41 of the motor vehicle 4 and a planned trajectory 51 of the motor vehicle 5 are identified based on the surroundings model, both of which extend through the area of the road intersection 1. It is recognized based on the intersecting trajectories 41, 51 and the surroundings model that upon driving off and associated driving of the automated motor vehicle 5 into the area of the road intersections 1, a collision of the two motor vehicles 4, 5 will occur, since the motor vehicle 4 has right of way and/or since the motor vehicle 4 can no longer prevent or can only prevent with a highly dynamic driving maneuver an imminent collision due to its trajectory and/or kinematics. The area of the road intersection 1 is thereupon identified as a collision-relevant area and the predicted driving off is prevented (for example by an automated actuation of the braking system), so that the automated motor vehicle 5 does not drive into the collision-critical area. The collision between the two motor vehicles 4, 5 can thus be avoided.

LIST OF REFERENCE SIGNS

1 road intersection
2 road
3 road
4 motor vehicle-external object/motor vehicle
41 planned trajectory
5 automated motor vehicle
51 planned trajectory
S1-S3 method steps

The invention claimed is:

1. A method for preventing an automated motor vehicle from driving-off, comprising:

recording sensor data relating to a status of a surroundings of the automated motor vehicle and a status of a driver of the automated motor vehicle;

predicting imminent driving-off of the automated motor vehicle triggered by the driver of the motor vehicle based on the sensor data, and controlling, based on the status of the surroundings, a longitudinal guidance system of the automated motor vehicle to prevent the predicted imminent driving off.

2. The method of claim 1, wherein sensors for recording the sensor data relating to the status of the driver of the automated motor vehicle comprise at least one of: interior sensors, pedal sensors, a steering angle sensor, a heart rate monitor of the driver, and operator interface sensors.

3. The method of claim 1, wherein sensors for recording the sensor data relating to the surroundings of the automated motor vehicle comprise at least one of: a radar sensor, a LiDAR sensor, a camera, and an ultrasonic sensor.

4. The method of claim 1, wherein the imminent driving off of the automated motor vehicle is predicted based on the sensor data relating to the status of the driver.

5. The method of claim 1, further comprising:

determining the status of the surroundings based on the sensor data relating to the status of the surroundings.

6. The method of claim 5, wherein the status of the surroundings is determined based on at least one of:

a surroundings model determined based on the sensor data relating to the status of the surroundings, mapped intersections and/or pedestrian crossings in the surroundings, and information received via a vehicle-to-everything communication relating to the surroundings of the automated motor vehicle.

7. The method of claim 5, wherein determining the status of the surroundings includes establishing a presence of a collision-critical area, and wherein the driving-off is only prevented when it is determined that the automated motor vehicle is in the collision-critical area and/or will be located in this the collision area due to the driving-off.

8. A device, comprising an electronic control unit configured to execute the method of claim 1.

9. An automated motor vehicle, comprising the device of claim 8.

10. A non-transitory computer-readable medium storing software instructions that, when executed by a computer, configure the computer to carry out the method of claim 1.

* * * * *